United States Patent

Strumpell

[15] 3,682,424
[45] Aug. 8, 1972

[54] TRANSPORTABLE CAMERA PEDESTAL

[72] Inventor: Winton C. Strumpell, 6027 Corning Avenue, Los Angeles County, Calif. 90056

[22] Filed: July 16, 1969

[21] Appl. No.: 842,147

[52] U.S. Cl.............................................248/162
[51] Int. Cl............................................F16m 11/28
[58] Field of Search.............248/123, 162, 297, 404; 297/339, 347, 437; 91/390

[56] References Cited

UNITED STATES PATENTS

| | | | |
|---|---|---|---|
| 2,215,666 | 9/1940 | Meitzler | 248/404 |
| 2,237,403 | 4/1941 | Bedford et al. | 248/404 |
| 2,352,678 | 7/1944 | Angell | 248/404 |
| 3,350,086 | 10/1967 | Decker | 297/347 |
| 3,167,289 | 1/1965 | Nasjleti | 248/162 |

FOREIGN PATENTS OR APPLICATIONS

1,218,457  12/1959  France........................248/162

Primary Examiner—Marion Parsons, Jr.
Attorney—George J. Netter and Kendrick and Subkow

[57] ABSTRACT

A wheeled base carries extendible column members related to each other via pulley wheel and cable apparatus for supporting a load at a preselectible height. Multiple telescoping tubes are provided with internal gas pressure for applying a force against one of the column members in a vertical direction. The pressure of the gas is such as to counterbalance the columns and load.

6 Claims, 11 Drawing Figures

Fig. 3.

INVENTOR,
WINTON C. STRUMPELL
BY KENDRICK AND SUBKOW

ATTORNEY

INVENTOR,
WINTON C. STRUMPELL
BY KENDRICK AND SUBKOW

ATTORNEY

Fig. 8.

TRANSPORTABLE CAMERA PEDESTAL

The present invention pertains generally to equipment pedestals, and, more particularly, to a transportable pedestal for television or movie camera equipment that is selectively adjustable to position the camera at any desired height.

BACKGROUND OF THE INVENTION

In the television and motion picture industry, it is frequently desirable to be able to position the camera (image orthicon apparatus in the case of television) at different heights in order to provide a particular angle or aspect of the scene being taken. Also, it is necessary that such changes in height be accomplished rapidly, and, of course, with a minimum amount of effort on the part of the operator. Still further, it is important that once the camera and pedestal have been adjusted to a new height position that this position be maintained throughout normal use of the camera until it is affirmatively changed.

There are various known types of movable camera pedestals operating on direct gear drive or hydraulic actuation which generally provide for changing elevation of the camera. Such units, although providing generally desired results, have been not completely satisfactory in several respects, a primary one being the relatively small range over which adjustable height can be accomplished.

More particularly, known hydraulic camera pedestal apparatus require a source of relatively high pressure fluid which always poses a potential problem of leaking fluid.

OBJECTS AND SUMMARY OF THE INVENTION

It is therefore a primary aim and object of this invention to provide a movable camera pedestal that is quickly and easily adjustable to any particular desired height over an extensive range.

Another object is the provision of a movable camera pedestal or dolly that is pneumatically counterbalanced permitting finger-pressure relocation of the camera to a different height.

In the practice of the present invention, there is provided on a wheeled base a pair of upwardly extending concentric, telescoped cylinders. The inner cylinder includes at upper end a platform on which the camera is mounted. Pneumatic drive means is coupled to the inner cylinder and includes means communicating with a source of pressurized air, or other gas. The outer and inner cylinders are related for common movement via a cabling and pulley wheel arrangement. The pressurized air or gas is of such value as to substantially balance the load of the camera and associated equipment whereby further force applied to the cylinder carrying the camera produces an unbalancing of the system and thus repositions the camera to a new level. Again, after repositioning of the supporting cylinder and camera, the air pressure counterbalances the system so that after relocation pressure is removed, the camera and supporting cylinder column maintain their new orientation.

Figure 1:
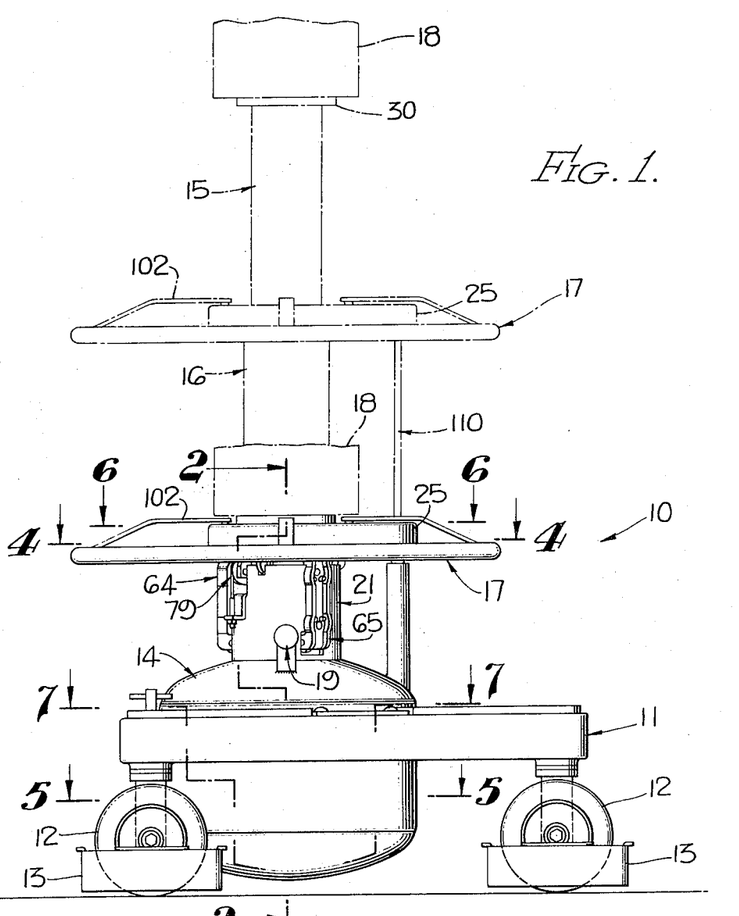
FIG. 1 is an elevational view of a transportable camera pedestal of the present invention illustrated in solid line in retracted position and in dotted line extended.

With reference now to the drawings and particularly FIG. 1, the camera pedestal of the invention is identified generally by the reference numeral 10. A support base 11 for the pedestal includes a plurality of wheels 12 conventionally mounted to its underside and with safety guards 13 to protect the operator and others in the vicinity. A housing 14 carried by the base 11 contains certain of the mechanism interrelating support columns 15 and 16. A control wheel 17 affixed to the upper end of column 16 is manually positionable to locate the camera and associated equipment 18 mounted at the upper end of 15 to a desired height. Locking member 19 enables fixing the vertical setting of the pedestal at any selected height. More particularly as will be more specifically described, the apparatus of the invention effects counterbalancing of the extendible columns 15, 16 and the equipment 18 so that on releasing locking member 19 only slight fingertip pressure on the wheel 17 is required to raise or lower the equipment 18 carried by the pedestal.

Figures 2, 2A:
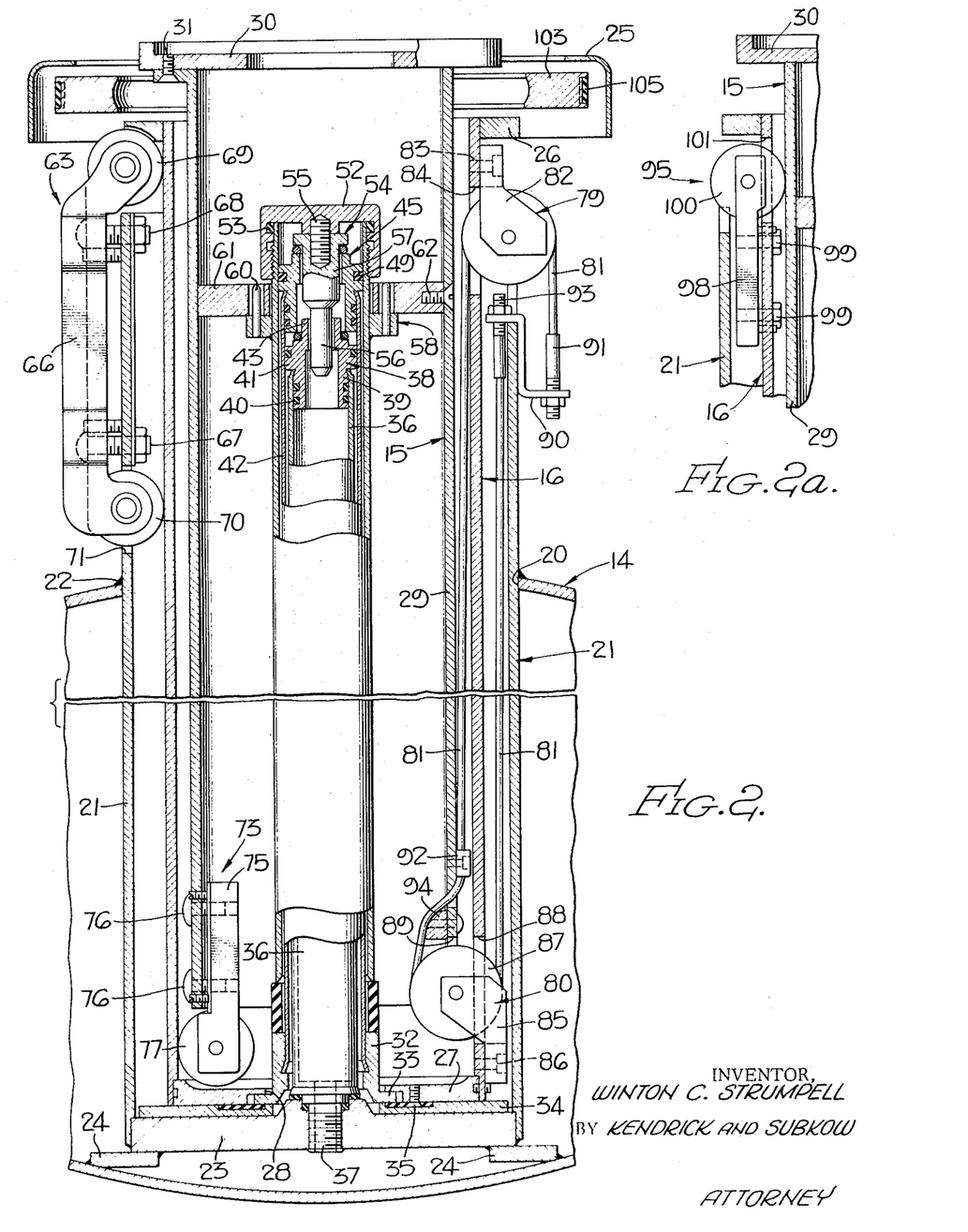
FIG. 2 is a vertical sectional view through the central column of the transportable pedestal of FIG. 1 taken along the line 2—2 and depicted in retracted position.
FIG. 2a is a fragmentary sectional view of a guide and locating roller for the main support cylinder of the invention.

Turning now to FIG. 2 and the more detailed structural aspects of the invention, the housing 14 is seen to comprise a generally tanklike enclosure with an opening 20 in its upper wall through which the columns 15 and 16 extend. Cylindrical wall member 21 is received within the opening 20 and secured to the housing 14 by weldments 22. The lower end of wall member 21 shoulders onto the outer edge of a circular base plate 23, which plate is weldingly affixed to an annular mount 24 secured to the lower wall of housing 14.

Telescoped within wall member 21 is the column 16 which comprises an open ended cylindrical tube including an enlarged hub or flange 25 secured to the column upper end as at 26. The lower or inner end of the column is affixed to the periphery of a disclike plate 27 which has an axial opening 28.

Column 15 is essentially a hollow cylindrical tube 29 concentrically disposed within the tube of column 16 and extending without its upper extremity. A camera and equipment supporting base plate 30 is secured to the flanged upper end of tube 29 by threaded members 31, for example.

Received through the opening in plate 27 is a hollow, upstanding hub 32, the lower end of which includes flanges 33 extending into accommodating shoulders of the plate 27. The annular plate 34 fits onto the lower surface of the disclike plate 27 and is secured thereto by threaded members 35 which simultaneously locks the flanges between the two plates. As seen best in FIG. 3, the cylindrical column 16, plates 27 and 34, and hub 32 form a single movable unit.

Figure 3:
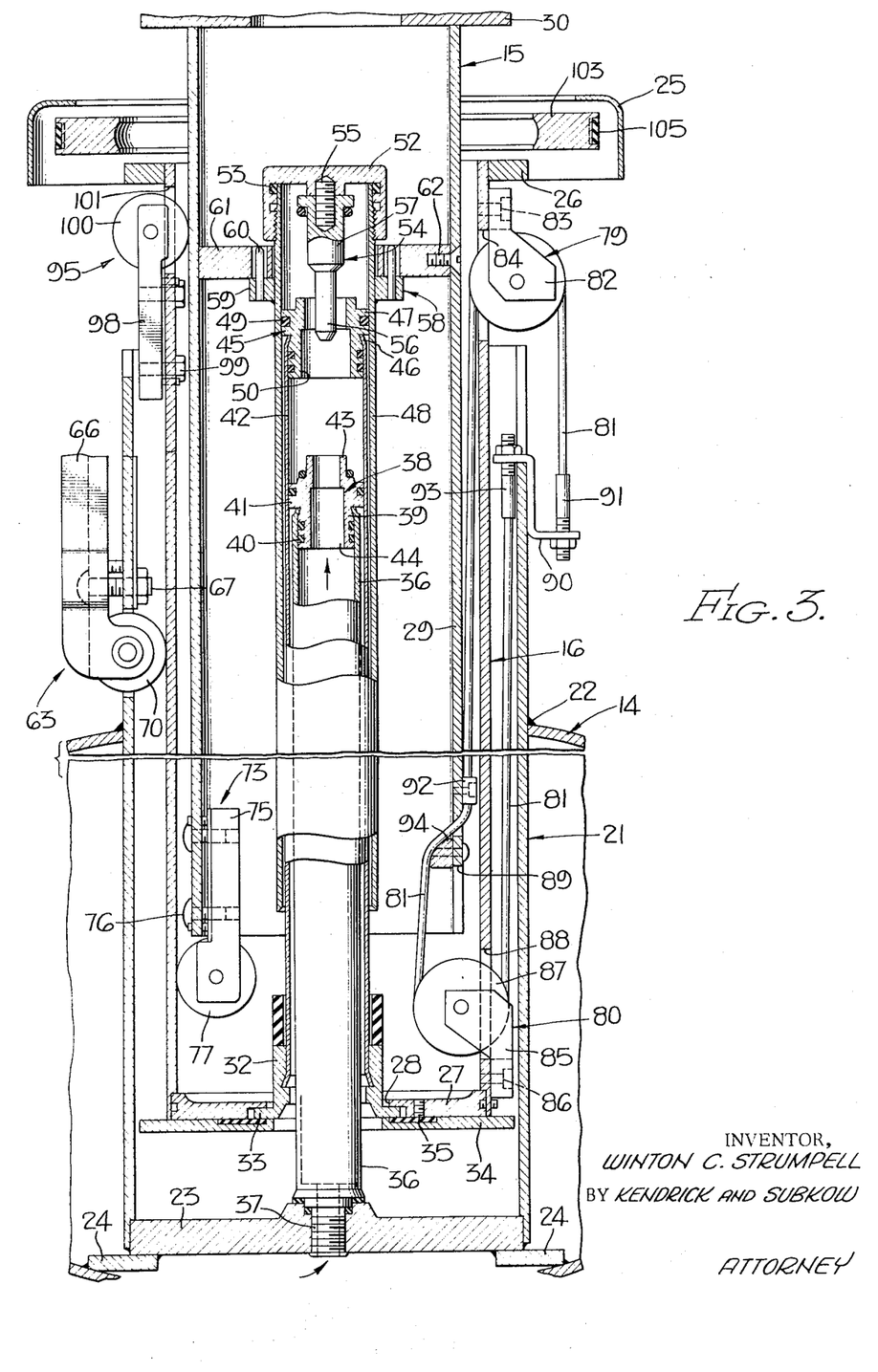
FIG. 3 is a vertical sectional view similar to FIG. 2 only showing the pedestal in extended form.

Reference is now made to both FIGS. 2 and 3. A hollow, cylindrical conduit 36, having its lower end secured to a threaded fitting 37 within base plate 23, extends upwardly through the bore of hub 32, and terminates at its upper end in nozzle means 38. More particularly, the nozzle means includes a portion 39 received within the upper end of conduit 36 and sealed compression rings 40; an enlarged flange 41 slidingly received within the bore of an elongated cylindrical chamber 42; a smaller diametral end portion 43; and a continuous bore 44 extending completely through the body and communicating with the interior of 36.

The lower end of cylindrical chamber 42 is secured within the bore of hub 32 by deforming the wall edges into accommodating shoulders of hub. The upper end of 42 is received onto a suitably dimensioned portion of a further nozzle means 45 and secured thereto by peening or swaging chamber wall ends as at 46. The nozzle means 45 includes a larger diametral portion 47 slidingly received within a drive cylinder 48 and made gas tight therewithin by sealing means 49. The bore within the means 45 has a large portion 50 that receives the upper part 51 of nozzle 38 when the apparatus is retracted as in FIG. 2.

The upper end of drive cylinder 48 is enclosed by a cap 52 threaded thereon and made gas tight by seal 53. Valving means 54 is axially secured to the inner surface of the cap 52 by a threaded stud 55. The valving means shank has an end portion 56 of such dimensions as to permit its receipt within the bore of 51, and a further portion 57 that is received within the bore of 45 in close fitting but noncontacting relation (FIG. 2).

Adjacent the upper end of drive cylinder 48 and spaced inwardly of the cap 52 there are provided guiding and locating means 58 including an annular mount 59 and upwardly directed positioning pins carried thereby. The pins 60 extend within oversize slots in an annular drive plate 61, the peripheral edges of which are affixed to the tube wall 29 by threaded members 62.

Figure 4:
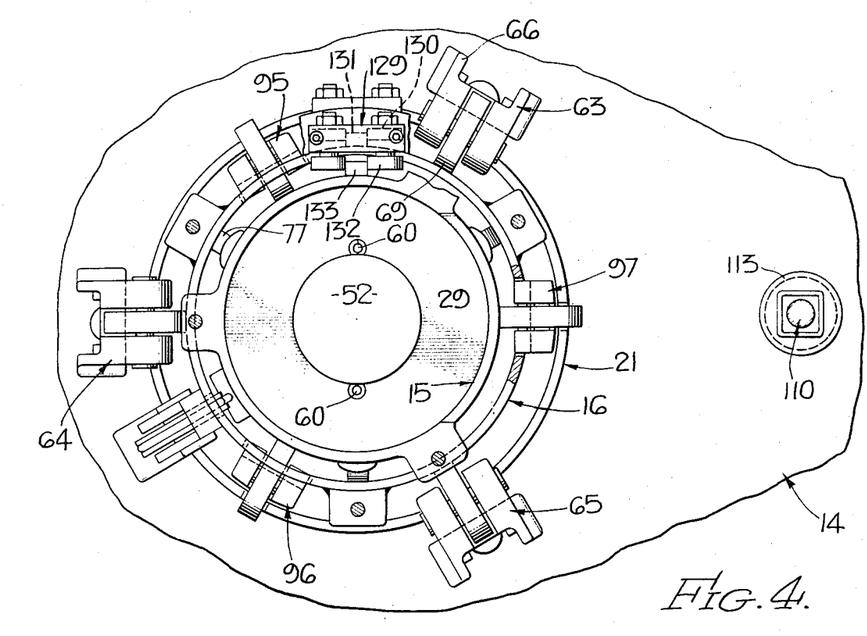
FIG. 4 is a sectional, plan view of the central column of the pedestal of FIG. 1 taken along the line 4—4.

Concentricity of the column 16 within wall member 21 is maintained by three sets of guide roller means 63-65 disposed at 120° locations about the column (FIG. 4). As seen best in FIG. 2, roller means set 63 includes an elongated roller bracket 66 secured to the outer surface of 21 by threaded fastening means 67, 68, the ends of which bracket are provided with rollers 69 and 70. Roller 69 extends inwardly of the upper edge of 21 to engage the outer surface of column 16 and maintain it spaced from the member. Similarly, roller 70 extends through opening 71 to contact column 16 and space it from 21. Roller sets 64 and 65 can be identical to 63.

Still referring to FIGS. 2 and 4, three further sets of roller assemblies, 72-74, and arranged at 120° about the central axis of cylindrical tube 29 and serve to maintain the parallel spaced relation of the tube 29 with respect to column 16. More particularly, roller assemblies 72, 73, 74 are located at the lower extremity of the tube 29, each including a vertically extending bracket 75 secured to the inner wall of tube 29 by threaded means 76. The lower end of the bracket 75 includes a roller 77 which engages the inner wall of column 16.

Coaction between the tube 29 and column 16 is produced via a pair of pulley wheel assemblies 79 and 80 interrelated by a cable 81. More particularly, a bracket 82 is secured to the outer surface of column 16 adjacent its upper end by means 83 with the pulley wheel extending through an opening 84 in the column wall. Similarly, the pulley wheel assembly includes a bracket 85 affixed to the column 16 adjacent its lower end by means 86, with the pulley wheel 87 thereof extending through opening 88 in column 16 and a similar opening 89 in the tube 29. The cable 81 has one end affixed to a support 90 via an adjustable tension member 91 and thence passing over the pulley wheel of assembly 79 between 16 and 29 where it is affixed to the outer surface of tube 29 by means 92 and continues over the pulley wheel 87 back up between 16 and 21 to terminate at the bracket 90 by a further adjustable tension member 93. Guide 94 directs the cable 81 into proper conjunction with pulley wheel 87. Accordingly, vertical movement of the tube 29 produces a separation of the lower portion of tube 29 from pulley wheel 87 and via cable 81 further causes a lifting action on the column 16. Compare, for example, FIG. 2 and FIG. 3 in this regard.

Still referring to FIG. 4, a further set of guiding and positioning roller assemblies 95-97 disposed at approximately 120° apart, act to maintain column 16 and tube 29 in a parallel spaced relation throughout operation. FIGS. 2a and 3 show the detailed construction of one such roller assembly. Specifically, the assembly includes a vertical bracket member 98 mounted to the outer upper surface of the column 16 by means 99. A roller 100 at the upper end of the bracket extends through an opening 101 for contacting the outer surface of tube 29.

Figure 4A:
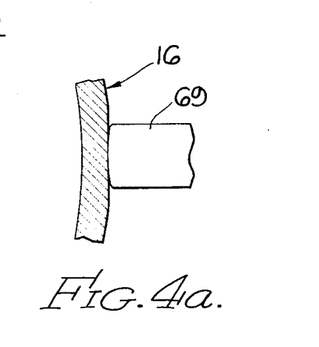
FIG. 4a is an enlarged fragmentary view of guide roller engagement.
Figure 5:
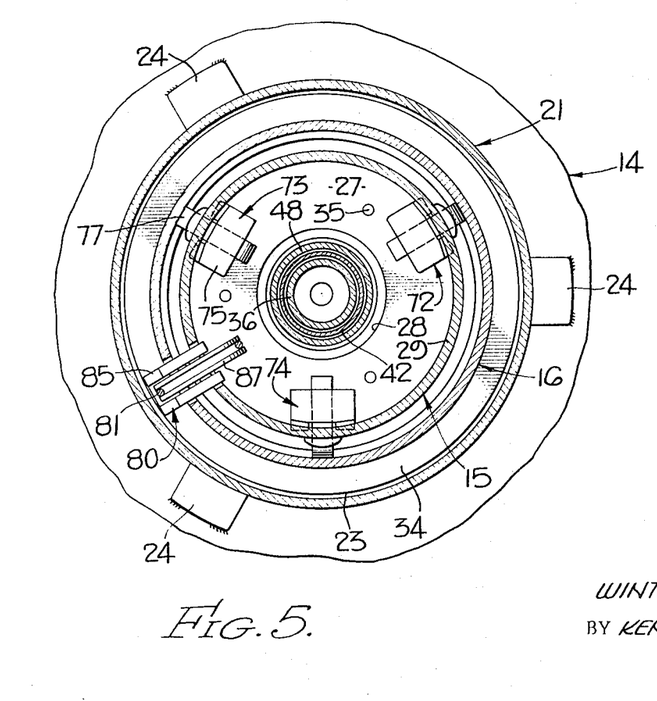
FIG. 5 is a horizontal sectional, plan view taken through the central column of FIG. 1 along the line 5—5.

To insure correct tracking and positioning by the roller assemblies 63-65, the outer surface portion of the column 16 that is contacted by the rollers of these assemblies are flattened as shown in FIG. 4a to provide a smooth contacting relation.

Figure 6:
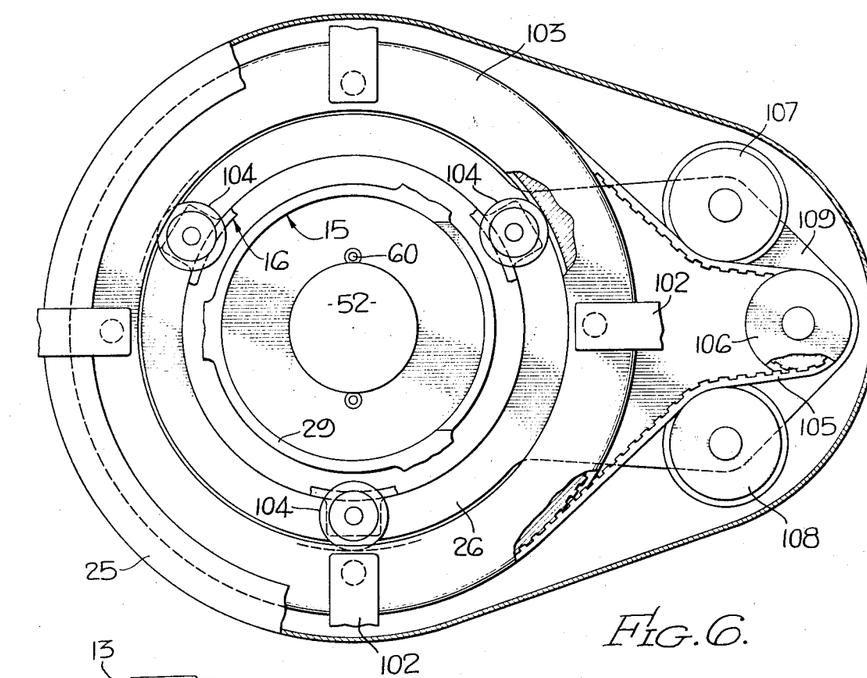
FIG. 6 is a sectional, plan view taken through the steering portion of the pedestal of FIG. 1 along the line 6—6.
Figure 7:
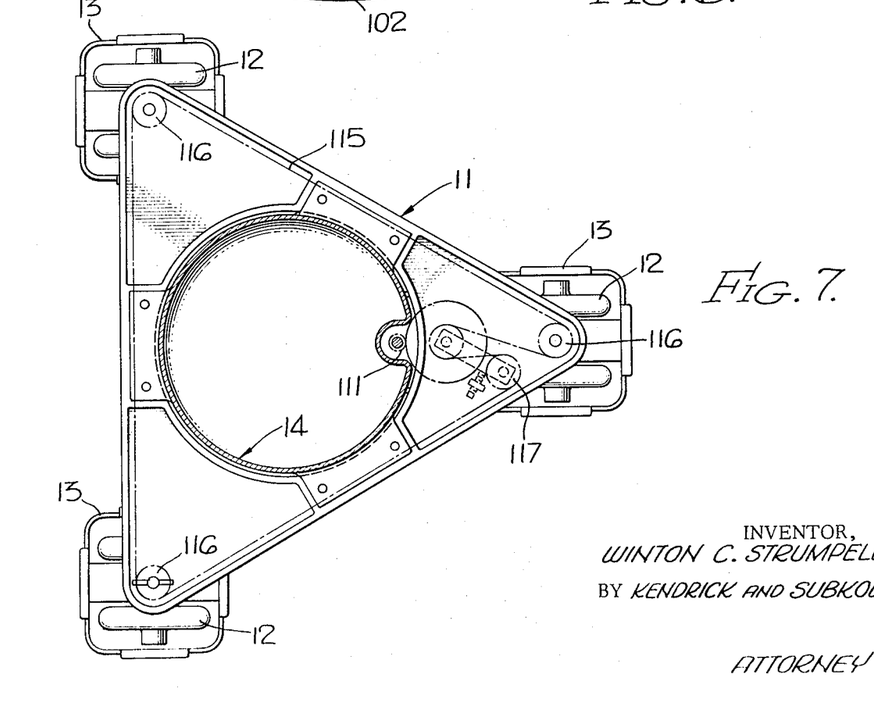
FIG. 7 is a sectional view taken just above FIG. 5 and along the line 7—7.
Figure 8:
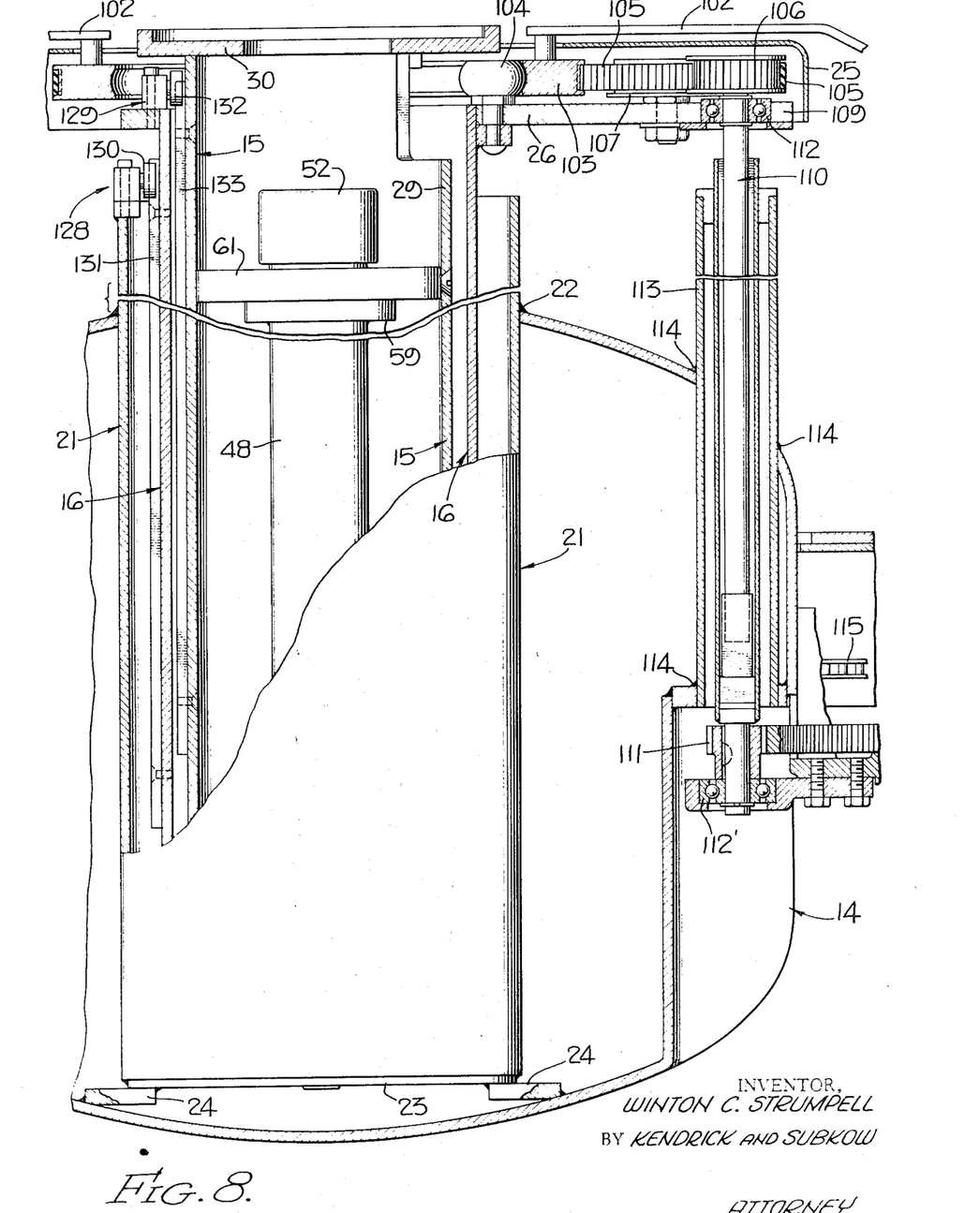
FIG. 8 is a sectional, partially fragmentary view of the present invention particularly showing the apparatus for controlling the pedestal horizontal orientation.

The apparatus of the present invention also provides for reorienting the wheels 12 by manipulation of the hand wheel 17 when it is desired to move the entire pedestal to a new location. More particularly, the center arms or spokes 102 of the wheel 17 are directly affixed to the upper surface of annular gear 103 shown in elevation in FIG. 8 and in plan in FIG. 6. The inner edge of the gear 103 rides against a plurality of locating rollers 104 which are secured to the column 16. As seen best in FIG. 6, rotative movement of the wheel 17 produces via center arms 102 a similar rotation of 103 which drives the sprocket belt 105 and thence driven gear 106. Gear 106, as well as idler wheels 107 and 108 are mounted on mounting plate 109 which is an integral extension of hub 26.

Extensible shaft means 110 has its upper end secured to gear 106 and its lower end affixed to pinion 111 and is journaled in bearings 112 and 112'. The central portions of 110 pass through a hollow tube arrangement 113 which is vertically attached to the housing 14 as, for example, by weldments 114. Pinnion 111 is geared to drive a sprocket chain 115 and thus spur gears 116 associated with each of the three wheels for the base 11. An adjustable tension gear 117 is also provided for conventional purposes.

Figure 9:
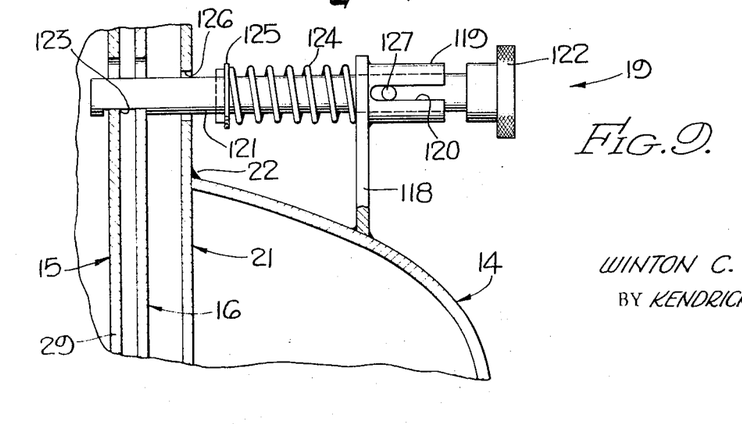
FIG. 9 is a sectional, partially fragmentary view of an orientation locking device.

FIG. 9 shows in sectional view the locking member 19. An upstanding stanchion 118, having its lower end secured to housing 14 includes a hollow tubular portion 119 at its upper end, the sides of which are slotted as at 120. A shaft 121 is slidingly received within the bore of 119, and includes a control knob 122 at one end and a notched end portion 123 at the other end. A compression coil spring 124 is received on the shaft, the ends of which engage the stanchion 118 and a collar 125 urging the shaft through the common opening 126 at 21, 16 and 29. A pin 127 on the shaft rides in the slot 120 during locking engagement. To lock, the loaded pedestal is moved to its lowermost position and the shaft 121 is inserted through the opening 126, after which the load (camera and associated equipment) is removed from the pedestal causing 29 to engage the shaft slotted end 123. To release the lock, either the gas pressure must be reduced or the load replaced on the pedestal after which the knob is pulled to the right as shown in FIG. 9 and rotated placing the pin 127 in engagement with the end of the tubular portion 119 which holds the end 123 free.

Returning now to FIGS. 4 and 8, there are shown two rollers assemblies 128 and 129. Assembly 128 is mounted on the upper end wall of 21 and includes rollers 130 for engaging the side surfaces of an elongated key 131 secured to column 16 to prevent rotation of this column. Similarly, assembly 129 mounted at the upper end column 16 has guide rollers 132 contactingly side wall surfaces of a key 133 affixed to column 15.

A further important and advantageous aspect of the invention is the dashpot action of elements 38, 45 and 54 as they reassume the position shown in FIG. 2 from an extended one. That is, the valving means shank 54 is only slightly less than the bore of 38 producing a cushioning or dashpot effect as the pedestal approaches its lowermost adjustment. This arrangement prevents plate 34 from striking 23 producing shock and vibrations that could damage the equipment carried by the pedestal.

OPERATION

With a given camera equipment load, gas pressure is increased through fitting 37 until the force of the gas on the cap 52, transmitted via the guiding and locating means 58 and drive plate 61 against the load is very nearly the same as the load In this counterbalanced state, vertical readjustment of the pedestal and load can be accomplished by mere fingertip pressure on the handwheel.

If it is desired to relocate the pedestal, rotation of handwheel 17 is transmitted to the annular gear 103, sprocket belt 114, gear 106, shaft 110, gear 114, and sprocket chain 115 to each of the wheel gears 116. In this manner, the wheels 12 can be turned in the direction of relocation making movement considerably easier.

There is provided in accordance with the practice of the present invention a portable dolly or pedestal particularly for use with television and motion picture camera equipment that includes multiple columns that are counterbalanced by fluid pressure permitting ready adjustment in height of the camera equipment. The counterbalancing apparatus has a minimum of contacting parts which provide frictional drag, therefore enhancing the ease and low force required to reposition the pedestal at different heights.

Although in the description of a preferred embodiment columns 16 and 29 are depicted as hollow tubes, it is considered within the spirit of the invention to construct such columns in alternative forms. For example, it is contemplated that the structure 16 and 29 could be replaced by vertical rods including a table or support base at the upper end similar to those illustrated and described herein. Moreover, although the basic counterbalancing means employed in the preferred embodiment relies upon gas or air pressure and is deemed more convenient and advantageous in several respects, it is considered within the spirit of the invention to substitute other conventional hydraulic liquids. Accordingly, it is to be understood that where the word "fluid" is used herein it pertains to either liquid or gas.

I claim:

1. A portable pedestal for carrying television camera equipment or the like, comprising:
   wheel mounted base means;
   first hollow tube means mounted on the base means and adapted for substantially vertical movement;
   second hollow tube means slidingly received within the first tube means and having an upper end portion on which the television camera equipment is carried;
   means interconnecting the first and second tube means for providing common vertical movement thereof; and
   gas powered counterbalancing means carried by the base means and connected to the second tube means for exerting an upward force on said second tube means, said counterbalancing means including,
   a drive plate secured within the upper end of said second tube means,
   a first hollow tube having one closed end and one open end secured to the drive plate with the open end extending downwardly,
   a second hollow tube with both ends open received within said first hollow tube,
   means interconnecting the lower end of said second tube with said first tube means for movement therewith,
   a third hollow tube with both ends open extending upwardly within said second hollow tube, the lower end of said third tube being connected to said base means,
   sliding sealing means interrelating the first tube to the second tube and the second tube to the third tube, and means interconnecting the open lower end of said third tube with a supply of pressurized gas for counterbalancing.

2. A portable pedestal as in claim 1, in which the means interconnecting the first and second tube means includes rotatable first and second pulley wheels mounted on said first tube means, cable means having its ends secured to the base means and the central portions thereof related to said pulley wheels, said cable means being secured to said second tube means whereby movement of said second tube means produces movement of said first tube means.

3. A portable pedestal as in claim 1, in which guide rollers carried by at least one of said tube means maintains said tube means in a substantially parallel spaced relation.

4. A portable pedestal as in claim 1, in which the gas is pressurized air.

5. A portable pedestal as in claim 1, in which there is further provided a valving means including a rodlike member secured to the inner closed end of said first hollow tube and extending downwardly therefrom, said member having a first diametral portion adjacent the tube closed end and a second lesser diametral portion outwardly of said first diametral portion; the upper open end of said second hollow tube having an opening of dimensions slightly larger than those of the rodlike member first diametral portion; the upper open end of said third hollow tube having an opening of dimensions slightly larger than those of the rodlike member second diametral portion, but less than those of the first diametral portion.

6. A portable pedestal for carrying television camera equipment, microphone boom or the like, comprising:
wheel mounted base means;
first hollow tube means mounted on the base means and adapted for substantially vertical movement;
second hollow tube means slidingly received within the first tube means and having an upper end portion on which the television camera equipment is carried;
means interconnecting the first and second tube means for providing common vertical movement thereof; and
gas powered counterbalancing means carried by the base means and connected to the second tube means for exerting an upward force on said second tube means, said counterbalancing means including,
a drive plate secured within the upper end of said second tube means,
driving member means secured to the drive plate and extending downwardly therefrom,
a first hollow tube with both ends open generally vertically disposed with its open upper end in fluid communication relation to said driving member means,
means interconnecting the lower end of said first tube with said first tube means for movement therewith,
a second hollow tube with both ends open extending upwardly within said first hollow tube, the lower end of said second tube being connected to said base means,
sliding sealing means interrelating the driving member means to the first tube and the first tube to the second tube, and
means interconnecting the open lower end of said second tube with a supply of pressurized gas for counterbalancing.

* * * * *